(12) United States Patent
Guynn

(10) Patent No.: US 7,396,473 B1
(45) Date of Patent: Jul. 8, 2008

(54) ENGINE OIL FILTER

(76) Inventor: Stacy D. Guynn, P.O. Box 8790, Longboat Key, FL (US) 34228

( * ) Notice: Subject to any disclaimer, the term of this patent is extended or adjusted under 35 U.S.C. 154(b) by 0 days.

(21) Appl. No.: 11/899,535

(22) Filed: Sep. 6, 2007

(51) Int. Cl.
B01D 37/00 (2006.01)

(52) U.S. Cl. .................. 210/774; 210/180; 210/184; 210/DIG. 17; 123/196 A

(58) Field of Classification Search .................. None
See application file for complete search history.

(56) References Cited

U.S. PATENT DOCUMENTS

| | | | | |
|---|---|---|---|---|
| 2,103,434 A * | 12/1937 | Pennebaker | .................. | 210/185 |
| 2,140,020 A * | 12/1938 | MacCormack | .............. | 210/301 |
| 2,346,042 A * | 4/1944 | Morris | ........................ | 210/184 |
| 2,348,247 A * | 5/1944 | Dushane, Jr. | ................. | 210/186 |
| 2,406,308 A * | 8/1946 | Stokes et al. | ................. | 210/131 |
| 2,785,109 A * | 3/1957 | Schwalge | ................... | 196/46.1 |
| 2,839,196 A * | 6/1958 | Schwalger | ................... | 210/180 |
| 3,616,885 A * | 11/1971 | Priest | ......................... | 196/128 |
| 3,915,860 A * | 10/1975 | Priest | ......................... | 210/136 |
| 3,998,738 A * | 12/1976 | Kusay | .......................... | 96/194 |
| 4,006,084 A * | 2/1977 | Priest | ......................... | 210/180 |
| 4,115,201 A * | 9/1978 | Malec | ......................... | 196/46.1 |
| 4,146,475 A * | 3/1979 | Forsland | ...................... | 210/774 |
| 4,189,351 A * | 2/1980 | Engel | .......................... | 196/115 |
| 4,227,969 A * | 10/1980 | Engel | .......................... | 196/115 |
| 4,272,371 A * | 6/1981 | Moses et al. | ............ | 210/167.04 |
| 4,289,583 A * | 9/1981 | Engel | .......................... | 196/115 |
| 4,338,189 A * | 7/1982 | Johnson, Sr. | ................ | 210/180 |
| 4,349,438 A * | 9/1982 | Sims | ............................ | 210/180 |
| 4,354,946 A * | 10/1982 | Warlick et al. | .............. | 210/774 |
| 4,369,110 A * | 1/1983 | Picek | .......................... | 210/180 |
| 4,388,185 A * | 6/1983 | Ott et al. | ...................... | 210/136 |
| 4,443,334 A * | 4/1984 | Shugarman et al. | .... | 210/167.07 |
| 4,585,924 A * | 4/1986 | Pakula | ......................... | 219/205 |
| 4,728,421 A * | 3/1988 | Moddemeyer | .............. | 210/232 |
| 4,753,724 A * | 6/1988 | Womble | ..................... | 210/180 |
| 4,758,338 A * | 7/1988 | Johnson, Sr. | ........... | 210/167.07 |
| 4,830,745 A * | 5/1989 | van der Meulen | ...... | 210/167.07 |
| 4,943,352 A * | 7/1990 | Lefebvre et al. | ........... | 196/46.1 |
| 5,198,104 A * | 3/1993 | Menyhert | .................... | 210/149 |
| 5,242,034 A * | 9/1993 | DePaul | ....................... | 184/6.22 |
| 5,322,596 A * | 6/1994 | Arntz | ......................... | 196/46.1 |
| 5,630,956 A * | 5/1997 | Lynch | ........................ | 210/180 |
| 5,843,284 A | 12/1998 | Waters et al. | .............. | 196/46.1 |
| RE36,527 E * | 1/2000 | Arntz | ......................... | 196/46.1 |
| 6,872,304 B1* | 3/2005 | Gebert | ........................ | 210/232 |
| 6,994,784 B2* | 2/2006 | Jainek | ........................ | 210/149 |
| 7,297,282 B2* | 11/2007 | Suzumori et al. | ........... | 210/767 |

* cited by examiner

Primary Examiner—Robert James Popovics
(74) Attorney, Agent, or Firm—Charles J. Prescott

(57) ABSTRACT

An engine oil filter assembly and method for removing solid and liquid contaminants from engine oil. After solid contaminants are removed by passing the oil under engine pressure upwardly through a fibrous filter element within a lower portion of a canister, the oil is then forced through a separator after which the filtered oil under pressure decompresses. A lid having a downwardly sloping central portion is closely spaced above a similar sloping central portion of the separator to define a heating channel therebetween. A heating element in fluid isolation from the heating channel radiates heat through the central lid portion to vaporize liquid contaminants still in the oil, the vaporized contaminants discharging through a vapor vent in the lid, the decontaminated oil passing by gravity through the heating channel into a drain insert and back into the engine via an oil return port.

3 Claims, 5 Drawing Sheets

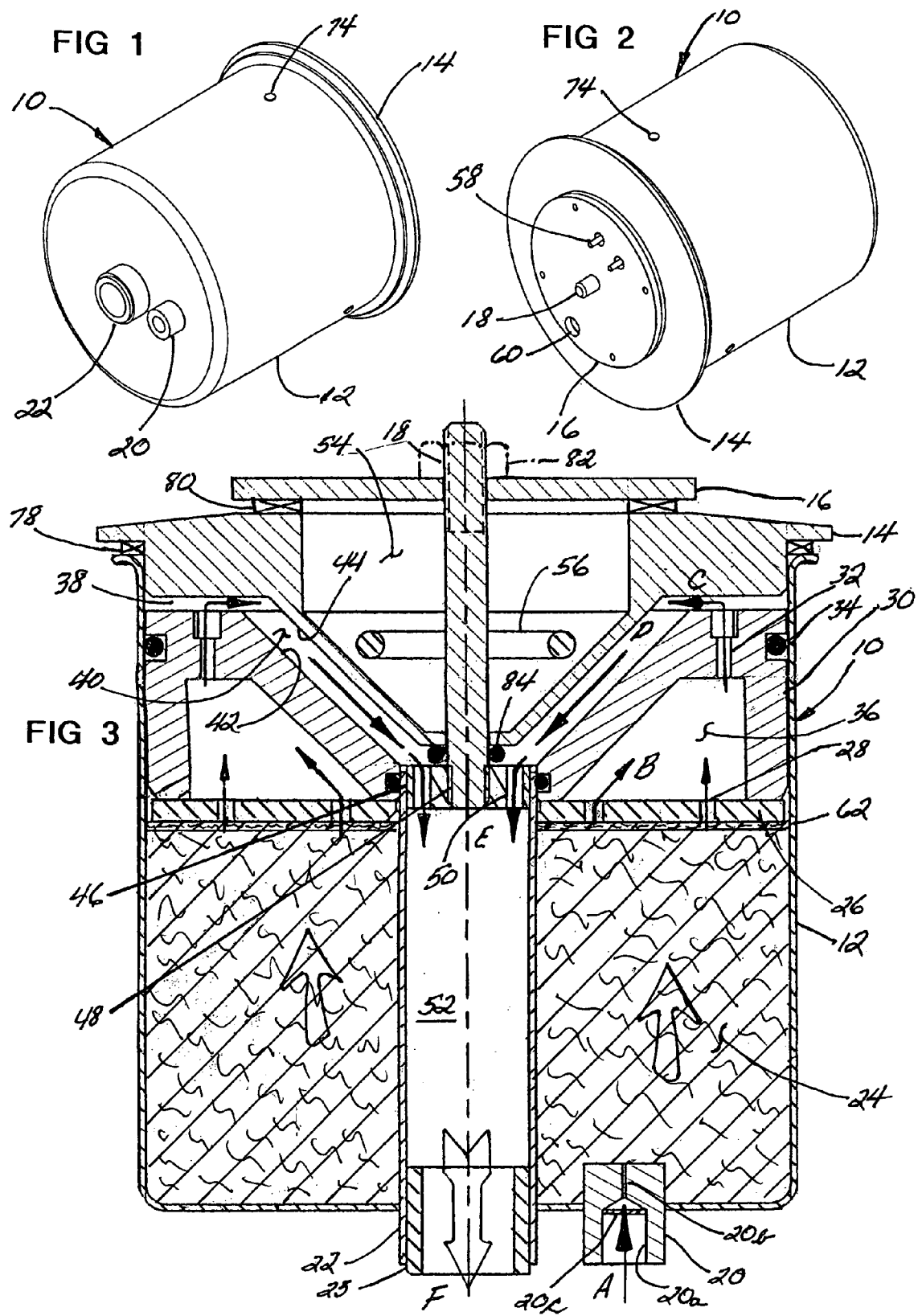

ENGINE OIL FILTER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to bypass filtration units for internal combustion engines and more particularly to an engine oil filter which is preferably reusable and provides both solid and liquid contaminant removal from engine oil.

2. Description of Related Art

Filtration or the removal of solid contaminants from engine oil via a canister bypass or flow-through filter is well known. As engine oil is circulated throughout an operating engine, solid contaminants are picked up and carried within the engine oil and, if not properly removed, can result in excessive or premature wear of the closely fitting internal engine components. The engine oil, typically operating at a pressure of about 40 to 60 psi, will produce a substantial force driving the engine oil into and through such canister oil filters for return to the engine crank case leaving solid contaminants within the canister filter.

One previous bypass filter design included no means for preventing oil flow stoppage therethrough due to debris clogging of oil passages while leakage around the internal separator plate allowing the oil to circumvent the separator plate and to drain back out into the oil pan without proper filtration are well known problems therewith.

For those oil filter designs which do not include a check valve means in the oil inlet, contaminated oil could easily drain back into the engine oil pan causing a time delay before oil refills the oil filter. Such prior art oil filters also have to be mounted level for best performance, any off level installation likely leading to a collection of oil on the lower side of the separation plate decreasing the filtration efficiency and occasionally causing oil leakage.

Previous oil filters which included a cal rod heating element positioned such heating elements in the bottom surface of the lid exposed to engine oil, leading to leakage around the ring holding it in place. Oil would also seep out from the filter around the electric terminal openings in the lid.

The present oil filter resolves these problems by allowing the filter to be mounted at up to a 45° angle without loss of filtration efficiency or leakage and includes a heating element which is not exposed to engine oil but yet is effective by its close proximity to oil passing through the filter to vaporize liquid contaminants for vented removal from the filter.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to an engine oil filter assembly and method for removing solid and liquid contaminants from engine oil. After solid contaminants are removed by passing the oil under engine pressure upwardly through a fibrous filter element within a lower portion of a canister, the oil is then forced through a separator after which the filtered oil under pressure decompresses. A lid having a downwardly sloping central portion is closely spaced above a similar sloping central portion of the separator to define a heating channel. A heating element in fluid isolation from the heating channel radiates heat through the central lid portion to vaporize liquid contaminants still in the oil, the vaporized contaminants discharging through a vapor vent lid, the decontaminated oil passing by gravity through the heating channel into a drain insert and back into the engine via an oil return port.

It is therefore an object of this disclosure to provide an engine oil filter which effectively removes both solid and liquid contaminants from engine crankcase oil circulating through an internal combustion engine.

Yet another object of this disclosure is to provide an engine oil filter which provides sufficient heat to engine oil passing therethrough to vaporize liquid contaminants without the oil flow coming in direct contact with the heating element.

Still another object of this disclosure is to provide a reusable engine oil filter which effectively removes both forms of contaminants from engine lubricating oil on a continuous basis.

And still another object of this disclosure is to provide an engine oil filter which may be oriented at up to about 45° from upright without any substantial loss in filtration effectiveness or leakage.

And another object of this disclosure is to provide an engine oil filter which is substantially leak free and avoids oil drainage back into the engine crank case and subsequent filtration time delay as a result thereof, as well as being substantially clog-free.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference of the drawings and by study of the following descriptions.

BRIEF DESCRIPTION OF THE SEVERAL VIEWS OF THE DRAWING(S)

FIG. 1 is a perspective view of the preferred embodiment of an engine oil filter of this disclosure.

FIG. 2 is another perspective view of FIG. 1.

FIG. 3 is a longitudinal section view of FIG. 1.

Figure 4:
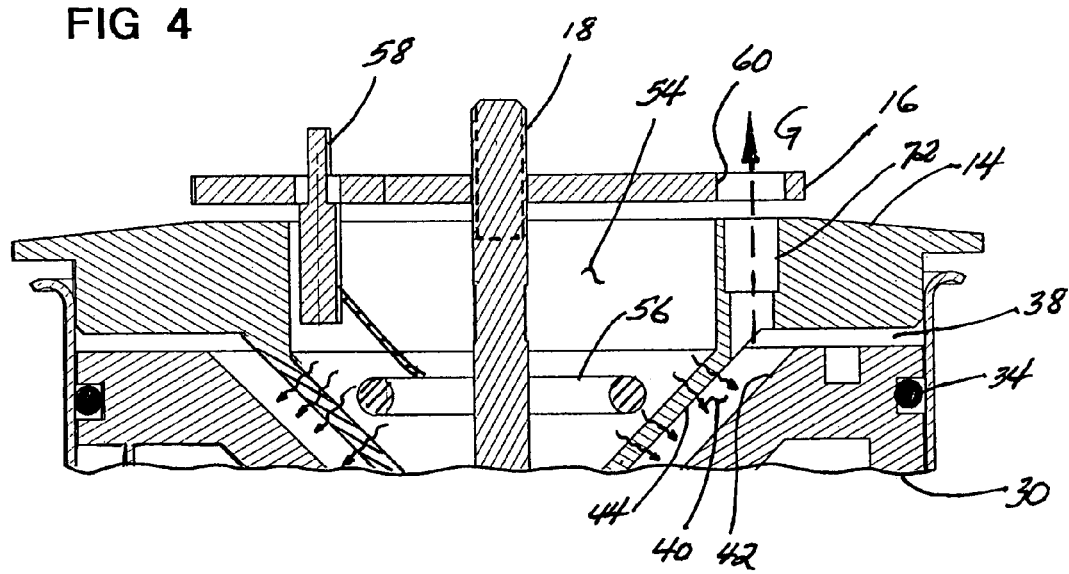
FIG. 4 is an enlarged partial section view of FIG. 1 passing through the heating element contact and the vapor vent in the lid thereof.
Figure 5:
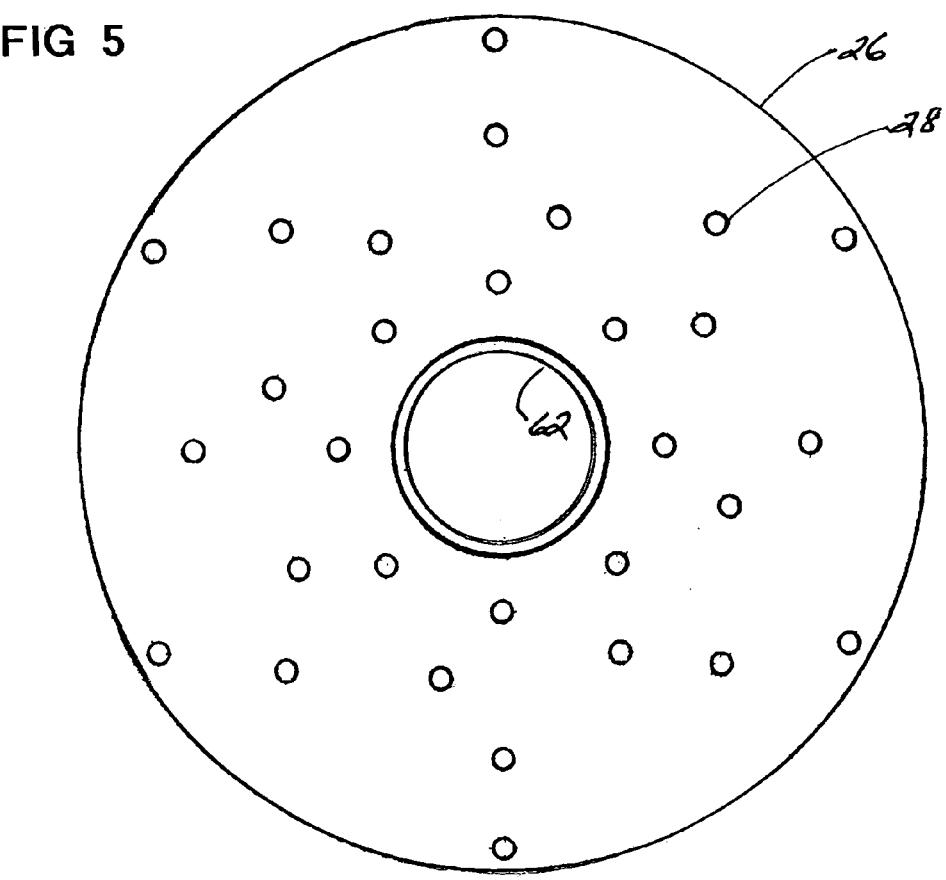
FIG. 5 is a top plan view of the perforated plate positioned atop the fibrous filter material within the canister of FIG. 1.

Exemplary embodiments are illustrated in reference figures of the drawings. It is intended that the embodiments and figures disclosed herein are to be considered to illustrative rather than limiting.

DETAILED DESCRIPTION OF THE INVENTION

Referring now to the drawings, the preferred embodiment of the engine oil filter assembly is there shown generally at numeral 10 and includes a formed metal thin-wall canister 12 generally having a cup shape with an outwardly flanged open end thereof as shown. The typical preferred diameter is approximately 6" and the length is also approximately 6". Removably positioned within the lower portion of the canister 12 is a long strand of cotton fibrous filter element 24 positioned against the bottom of the canister 12 and protectively covered by a thin ⅛" thick removable felt pad 62 positioned thereatop. The filter element 24 is designed to filter solid contaminant particulate matter from the engine oil down to approximately 0.3 microns.

Connected through the bottom of the canister 12 is an oil inlet fitting 20 having a lower central portion thereof threaded at 20a for interconnection to the oil circulating system of an internal combustion engine. A 0.020 mesh stainless steel screen 20c prefilters large solid contaminants and is easily removed for cleaning so that the smaller inlet orifice 20c preferably having a diameter of 0.030" will not be clogged by larger sized contaminants which are blocked and collected for later removal by the filter screen 20c.

Oil enters into and upwardly flows through the filter element 24 under a substantial engine oil system operating pressure of approximately 40 to 60 psi. Based upon the 6" diameter of the filter element, this produces a net upward force of between 1100 and 1700 lbs. of pressure. To insure that the fibrous material of the filter element 24 is not forced into the upper portion of the filter assembly 10 (described herebelow), a felt pad 62 (⅛" thick) is positioned directly atop the filter element 24 followed by a perforated plate 26 preferably formed of 3/16" steel plate having flow orifices 28 of 3/16" diameter.

Figure 16:
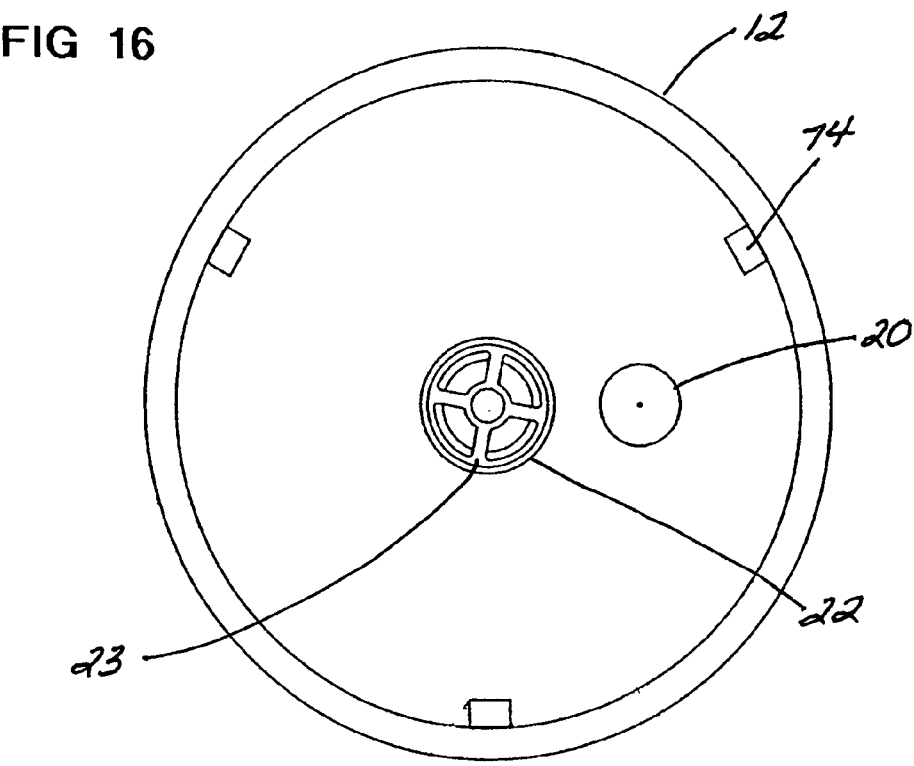
FIG. 16 is a top plan view of FIG. 15.
Figure 15:
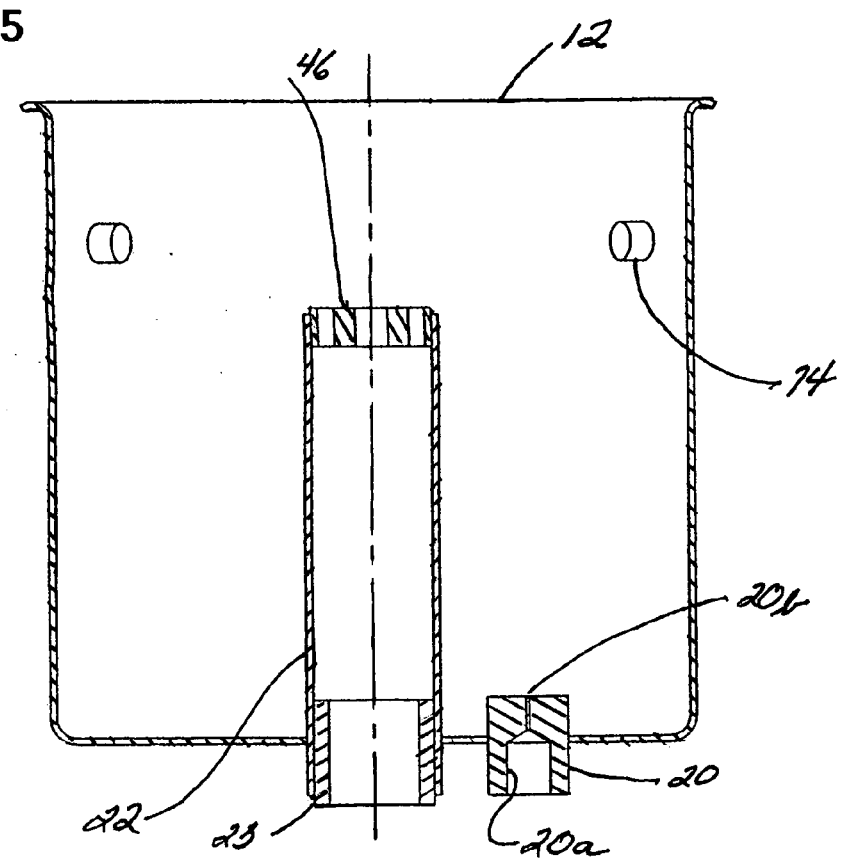
FIG. 15 is a section view of the canister assembly of FIG. 1.

As best seen in FIGS. 15 and 16, the canister 12 also includes a central longitudinally extending drain tube 22 secured into the bottom of the canister 12 and including a forced fit tubular oil return port 23 threaded for interconnection to the oil circulating system of the engine. Secured at the upper end of the drain tube 22 is a drain insert 46 also best seen in FIGS. 15 and 16.

Positioned within the upper portion of the canister 12 and directly atop the perforated plate 26 is a separator 30 formed of 6061 aluminum, as best shown in FIGS. 3 and 6 through 9. The separator 30 is sealingly engaged within the canister 12 by o-rings 34 again directly atop the perforated plate 26 and is removably sealed in place around the upper end of the drain tube 22 by an o-ring as shown. The separator 30 includes bayonet cavities 68 which lockingly twist into engagement with bayonet lock pins 74 on canister 12 to secure the separator 30.

Figure 8:
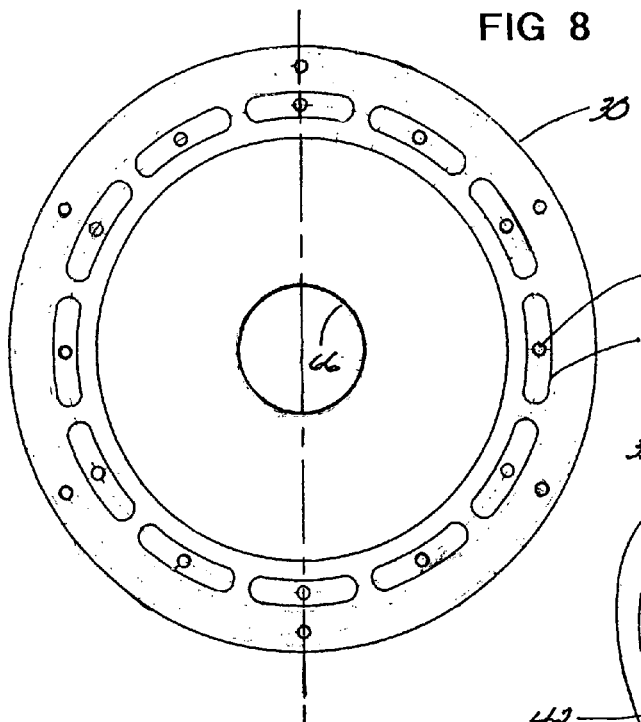
FIG. 8 is a top plan view of FIG. 6.
Figure 6:
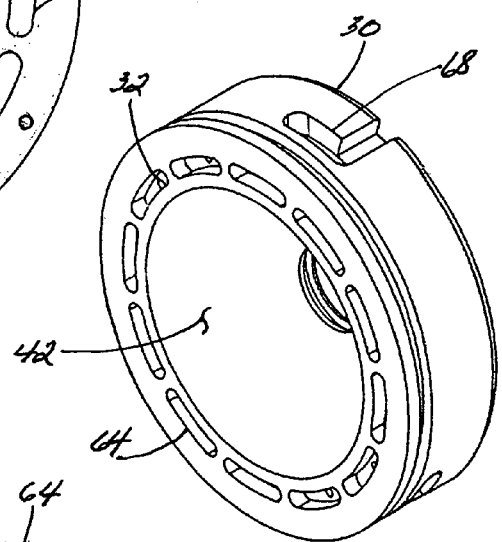
FIG. 6 is a perspective view of the separator within the canister of FIG. 1.
Figure 9:
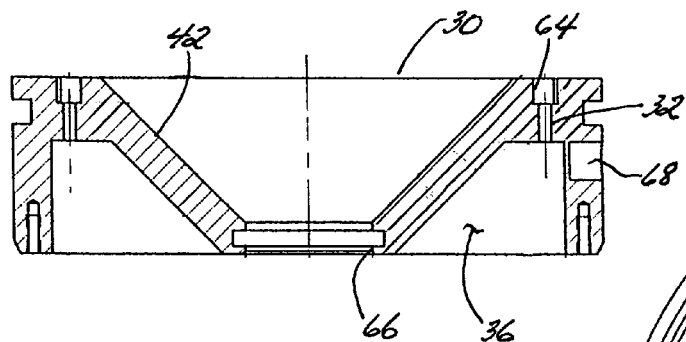
FIG. 9 is a cross section view of the separator of FIG. 6.
Figure 7:
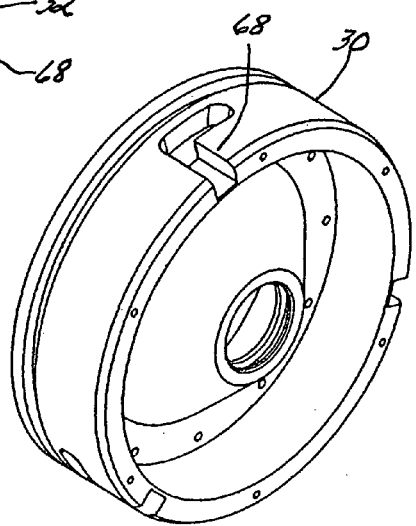
FIG. 7 is another perspective view of FIG. 6.
Figure 10:
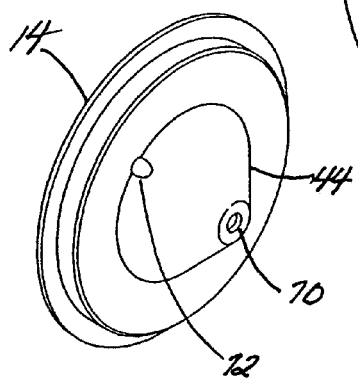
FIG. 10 is a perspective view of the lid of FIG. 1.
Figure 12:
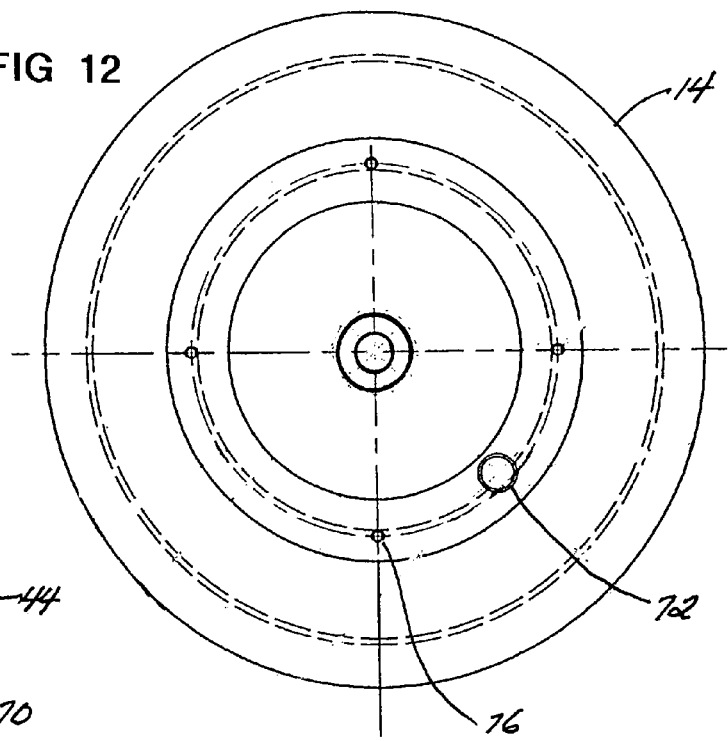
FIG. 12 is a top plan view of FIG. 11.
Figure 11:
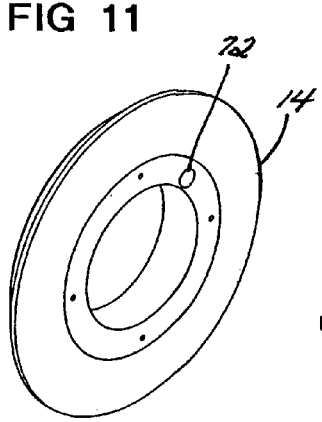
FIG. 11 is another perspective view of the lid of FIG. 10.
Figure 13:
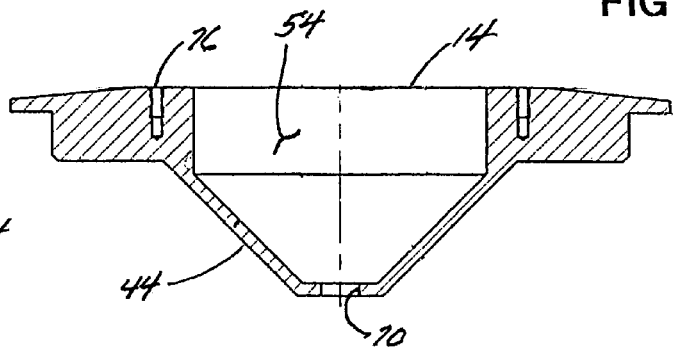
FIG. 13 is a section view of FIG. 10.
Figure 14:
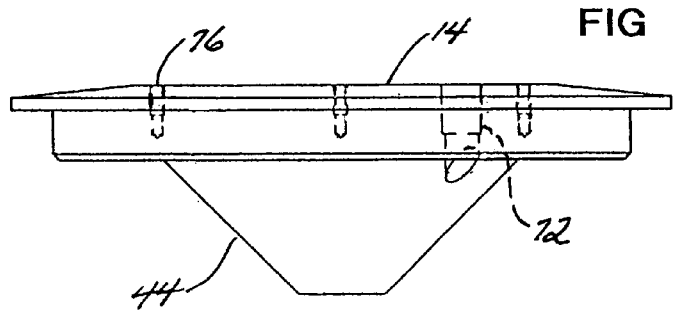
FIG. 14 is a side elevation view of FIG. 12.

The separator 30 defines a circular or annular shaped chamber 26 into which the partially filtered engine oil passes through perforations 28 in the direction of arrow B. From there, the engine oil passes upwardly through orifices 32 in the direction of arrow C. Each orifice 32 is upwardly enlarged at oil pockets 64 which extend in a segmented circle as best seen in FIG. 8.

The oil pockets 64 are designed to give a wider spread of oil down the 45° slope of separator 30.

Positioned directly above the separator 30 is a lid 14 also machined of 6061 aluminum which is sealably engaged against the outwardly extending flange of the canister 12 by a neoprene gasket 78. A hole in the center of the lid 14 slidably engages over an elongated stud 18 which is threadably engaged at 48 into the drain insert 46. An o-ring seal around the lower portion of the stud 18 and against the central upper surface of the drain insert 46 fully seals this arrangement from unintended oil leakage.

The central portion of the separator 30 includes an upwardly facing wall surface 42 positioned above the oil cavity 36 which downwardly slopes in conical-shaped fashion toward the central axis of the assembly 10. The lid 14 also includes a central portion which defines a conically-shaped downwardly extending surface 44 positioned in spaced relationship directly above the drain surface 42 of separator 30 to define a generally conically shaped sloped heating channel 40 into which the partially filtered oil enters from orifices 32 again in the direction of arrow C.

While descending within this heating channel 40 in the direction of arrow D, as best seen in FIG. 4, a ring-shaped heating element 56 is in electrical communication within a heating chamber 54 with electrical heat element contacts 58 shown extending and isolated from a top cap 16 in FIG. 2. (The connecting wiring between the contacts 58 and the heating element 56 are not shown for clarity). The top cap 16 is sealingly engaged around the heating chamber 54 and against the corresponding surface of lid 14 as best seen in FIG. 3 by a neoprene gasket 80. A threaded nut 82 shown in phantom atop the top cap 16 tightly secures and sandwiches the lid 14 and separator 30 into the sealing arrangement best seen in FIG. 3.

As best seen in FIGS. 4 and 10 to 14, the lid 14 includes a vapor vent 72 in fluid communication with the oil passage 38 and heating channel 40 formed between the separator 30 and the lid 14. As heat radiates from the heating chamber 54 into the heating channel 40, the partially contaminated oil flowing downwardly through the heating channel 40 in the direction of arrow D is heated to approximately 200° F. by heating element 56 as previously described. Substantially all remaining liquid contaminants such as acids, water, and other foreign liquid contaminants which are harmful to the interior moving parts of the engine are thus vaporized. These vaporized contaminants are then allowed by the heating thereof to upwardly exit through the vapor vent 72 which is in alignment with the vent port clearance hole 60 formed through the top cap 16.

Referring again to FIG. 3, the fully decontaminated engine oil then passes by gravity downwardly through drain slots 50 in the drain insert 46 in the direction of arrows E for gravity discharge in the direction of arrow F from the oil return port 23.

Note that, because the heating channel 40 is conically shaped and preferably uprightly oriented at a slope of approximately 45° and because the oil return port 23 is positioned centrally in the bottom of the canister 12, the assembly 10 may be oriented up to an angle of approximately 45° to vertical and still avoiding oil pooling which may be harmful to operation of the assembly and also a classic cause for oil leakage from one of the seals within the assembly 10. Note further that many such engine oil filters do not afford the benefit of vaporizing liquid contaminants. By partially vaporizing such liquid contaminants from the oil as it decompresses while passing through the orifices 32 and into grooves 64 around each one of the orifices 32 of the separator 30, full vaporization and discharge thereof through the vapor vent 72 greatly enhances the benefit of the added heat for this full contaminant vaporization.

Because the inlet orifice 20b in the oil inlet fitting may be made quite small (0.03") and is made free of clogging by the smaller mesh filter screens 20c (0.020" mesh size) which may be easily removed for cleaning, when oil pressure within the filter element 24 diminishes while the engine is non-operational, residue oil will not flow backwardly through the inlet orifice 20b due to its small size. Yet, under the operating pressure of the oil circulating system in the range of 40-60 psi as previously described, oil flow into the canister 12 through this orifice 20b is substantially unobstructed and of more than ample fluid flow in the range of about one quart of oil every half hour.

Importantly, the heating elements 56 and 58 within the heating chamber 54 are completely isolated from direct communication with the oil flowing through the heating channel 40 which avoids any direct contact between the heating elements and the oil flow which could lead to localized overheating of the oil and deterioration thereof.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. An engine oil filter assembly comprising:
a canister open at an upper end thereof and including an oil inlet orifice and an oil return port connected through a lower end of said canister, said oil return port being located centrally in a bottom of said canister;
a fibrous filter element disposed in a lower portion of said canister and against said bottom, said filter element adapted to remove solid contaminants from oil entering said inlet orifice and passing upwardly therethrough;
a perforated plate positioned atop said filter element and including perforations formed therethrough which allow passage of filtered oil passing upwardly through said filter element, while restricting fibrous portions of said filter element from passing upwardly through said perforations;
a filtered oil cavity formed between an upper surface of said perforated plate and a lower surface of a separator plate, said separator plate including separator orifices formed through an upper surface thereof through which the filtered oil under pressure within said filtered oil cavity flows;
a lid sealingly connected to the open end of said canister, said lid having a central portion which slopes downwardly toward a central axis of said canister and being spaced in proximity to and above a similar sloping central portion of said separator to define a heating channel extending downwardly and inwardly to an oil drain insert connected to an upper end of an oil drain passage, said oil drain passage passing centrally downwardly through said filter element and extending to said oil discharge port;
a heating element in fluid isolation from and in close proximity to, said heating channel above the central portion of said lid to heat and vaporize liquid contaminants in the oil passing and decompressing into said heating channel from said separator orifices, the vaporized contaminants discharging upwardly from said heating channel through a vapor vent formed in said lid, the oil decontaminated passing by gravity through said drain insert and said oil return port.

2. An engine oil filter assembly comprising:
a canister open at an upper end thereof and including an oil inlet orifice and an oil return port connected through a lower end of said canister, said oil return port being located centrally in a bottom of said canister;
a fiber filter element disposed in a lower portion of said canister and against said bottom, said filter element structured to remove solid contaminants from oil entering said inlet orifice and passing upwardly therethrough under engine pressure;
said inlet orifice being sufficiently small to substantially prevent engine oil from draining outwardly therefrom, when the engine is not running;
a perforated plate positioned atop said filter element and including perforations formed therethrough sized to allow passage of filtered oil passing upwardly through said filter element while substantially preventing fibrous portions of said filter element from passing upwardly therethrough;
a filtered oil cavity formed between an upper surface of said perforated plate and a lower surface of a separator plate, said separator plate including separator orifices formed through an upper surface thereof through which the filtered oil under pressure within said filtered oil cavity flows and decompresses the oil;
a lid sealingly connected to the open end of said canister, said lid having a central portion which slopes downwardly toward the center of said canister and spaced above and in close proximity to a similar sloping central portion of said separator to define a downwardly sloped conically-shaped heating channel extending downwardly and inwardly to an oil drain insert connected to an upper end of an oil drain passage, said oil drain passage passing centrally through and in fluid isolation from said filter element and extending to said oil discharge port;
a heating element in fluid isolation from, but in close proximity to, said heating channel above the central portion of said lid to heat and vaporize liquid contaminants in the decompressed oil passing into said heating channel from said separator orifices, the vaporized contaminants separating from the decompressed oil and discharging from said heating channel through a vapor vent formed in said lid, the decontaminated oil flowing by gravity through said drain insert and said oil return port.

3. A method of filtering engine oil circulating in an operating internal combustion engine comprising the steps of:
A. providing an oil filter assembly including:
a canister open at an upper end thereof and including an oil inlet orifice and an oil return port connected through a lower end of said canister, said oil return port being located centrally in a bottom of said canister;
a fiber filter element disposed in a lower portion of said canister and against said bottom, said filter element structured to remove solid contaminants from oil entering said inlet orifice and passing upwardly therethrough;

a perforated plate positioned atop said filter element and including perforations formed therethrough which allow passage of filtered oil passing upwardly through said filter element;

a filtered oil cavity formed between an upper surface of said perforated plate and a lower surface of a separator plate, said separator plate including separator orifices formed through an upper surface thereof through which the filtered oil under pressure within said filtered oil cavity flows;

a lid sealingly connected to the open end of said canister, said lid having a central portion which slopes downwardly toward a central axis of said canister and is spaced above a similar sloping central portion of said separator to define a heating channel extending downwardly and inwardly to an oil drain insert connected to an upper end of an oil drain passage, said oil drain passage passing centrally through said filter element extending to said oil discharge port;

a heating element in fluid isolation from, but in close proximity to, said heating channel above the central portion of said lid to heat and vaporize liquid contaminants in the oil passing and decompressing into said heating channel from said separator orifices, the vaporized contaminants discharging upwardly from said heating channel through a vapor vent formed in said lid, the oil passing by gravity through said drain insert and said oil return port;

B. operating the engine after said filter assembly is attached to the engine to flow engine oil into said canister by internal engine pressure through said inlet orifice and then upwardly through said filter element and the perforations to remove solid contaminants from the engine oil;

C. decompressing and heating the oil within an upper portion of said filter assembly to vaporize liquid contaminants in the oil within the heating channel;

D. allowing the vaporized decontaminants to vent from the vapor vent;

E. draining the decontaminated oil by gravity downwardly in the heating channel into and through the central drain insert and back into the engine through the oil return port.

* * * * *